United States Patent
Amar et al.

(10) Patent No.: US 11,385,366 B2
(45) Date of Patent: Jul. 12, 2022

(54) LIGHTNING PROTECTION FOR LAND SEISMIC SENSOR UNIT

(71) Applicant: WesternGeco LLC, Houston, TX (US)

(72) Inventors: Sara Amar, Asker (NO); Lars Muller, Jävrebyn (SE)

(73) Assignee: WesternGeco L.L.C., Houston, TX (US)

( * ) Notice: Subject to any disclaimer, the term of this patent is extended or adjusted under 35 U.S.C. 154(b) by 506 days.

(21) Appl. No.: 16/094,485

(22) PCT Filed: Oct. 5, 2016

(86) PCT No.: PCT/US2016/055591
§ 371 (c)(1),
(2) Date: Oct. 18, 2018

(87) PCT Pub. No.: WO2017/184197
PCT Pub. Date: Oct. 26, 2017

(65) Prior Publication Data
US 2019/0120983 A1 Apr. 25, 2019

Related U.S. Application Data

(60) Provisional application No. 62/324,329, filed on Apr. 18, 2016.

(51) Int. Cl.
*G01V 1/18* (2006.01)
*G01V 1/16* (2006.01)
(Continued)

(52) U.S. Cl.
CPC ............... *G01V 1/18* (2013.01); *G01V 1/003* (2013.01); *G01V 1/162* (2013.01); *G01V 1/166* (2013.01); *H02G 13/00* (2013.01)

(58) Field of Classification Search
CPC .......... G01V 1/18; G01V 1/003; G01V 1/162; G01V 1/166; H02G 13/00; H01C 7/12; H01C 8/04; H01G 9/18
See application file for complete search history.

(56) References Cited

U.S. PATENT DOCUMENTS 1,311,063 A * 7/1919 Gabel ....................... H01T 4/06
361/119
2,705,314 A 3/1955 Gaby
(Continued)

FOREIGN PATENT DOCUMENTS

EP 1166595 B1 * 7/2008 ............. G01V 1/181
WO 9520770 A1 8/1995
(Continued)

OTHER PUBLICATIONS

International Preliminary Report on Patentability issued in the related PCT application PCT/US2016/055591, dated Nov. 1, 2018 (13 pages).
(Continued)

*Primary Examiner* — Isam A Alsomiri
*Assistant Examiner* — Vikas Atmakuri
(74) *Attorney, Agent, or Firm* — Fletcher Yoder, PC

(57) ABSTRACT

A seismic sensor assembly includes a sensor body; cable connectors operatively coupled to the sensor body; and a grounding clamp operatively coupled to the cable connectors. A lightning strike kit for a seismic sensor assembly can include the grounding clamp as an electrically conductive component for electrical coupling to a base and/or a spike of a seismic sensor assembly.

19 Claims, 8 Drawing Sheets

(51) Int. Cl.
  *G01V 1/00* (2006.01)
  *H02G 13/00* (2006.01)

(56) References Cited

U.S. PATENT DOCUMENTS

| | | | | |
|---|---|---|---|---|
| 3,517,316 | A * | 6/1970 | Hatcher | G01V 1/001 |
| | | | | 340/525 |
| 3,967,259 | A * | 6/1976 | Lecuyer | G01V 1/20 |
| | | | | 340/508 |
| 5,296,842 | A * | 3/1994 | Kato | G01W 1/16 |
| | | | | 340/601 |
| 5,369,626 | A | 11/1994 | Carroll | |
| 5,502,612 | A * | 3/1996 | Osterhout | H01C 7/12 |
| | | | | 361/117 |
| 7,465,874 | B2 * | 12/2008 | Obleman, Jr. | H01R 4/66 |
| | | | | 174/3 |
| 7,817,398 | B1 * | 10/2010 | Maples | H04Q 1/146 |
| | | | | 361/118 |
| 9,013,170 | B2 * | 4/2015 | Yamaguchi | B64D 45/02 |
| | | | | 324/72 |
| 9,042,072 | B2 * | 5/2015 | Knobloch | H02H 9/042 |
| | | | | 361/111 |
| 2004/0183686 | A1 * | 9/2004 | Jones | G01R 29/0842 |
| | | | | 340/601 |
| 2010/0020647 | A1 | 1/2010 | Hache et al. | |
| 2011/0020134 | A1 * | 1/2011 | Jensen | H01C 7/12 |
| | | | | 416/241 R |
| 2014/0126329 | A1 | 5/2014 | Guyton et al. | |
| 2014/0153170 | A1 | 6/2014 | Pichot et al. | |
| 2015/0043310 | A1 | 2/2015 | Maas et al. | |
| 2017/0350374 | A1 * | 12/2017 | March Nomen | H01C 7/12 |
| 2019/0250290 | A1 * | 8/2019 | Oeverland | G01V 1/181 |

FOREIGN PATENT DOCUMENTS

| | | | | |
|---|---|---|---|---|
| WO | WO-9520770 A1 * | 8/1995 | | G01V 1/16 |
| WO | WO-2013083114 A2 * | 6/2013 | | G01V 1/003 |
| WO | WO2016014881 A1 | 1/2016 | | |

OTHER PUBLICATIONS

Examination Report issued in the related GC application GC/2017/32881 dated Apr. 18, 2019 (3 pages).
International Search report and written opinion issued in the related PCT application PCT/US2016/055591, dated Jan. 20, 2017; 16 pages.
Examination Report issued in the related GC application GC/2017/32881 dated Dec. 24, 2018 (4 pages).
Extended Search Report issued in the related EP Application EP16899679.1, dated Nov. 22, 2019 (8 pages).

* cited by examiner

LIGHTNING PROTECTION FOR LAND SEISMIC SENSOR UNIT

RELATED APPLICATIONS

This application claims priority to and the benefit of a U.S. Provisional Application having Ser. No. 62/324,329, filed 18 Apr. 2016, which is incorporated by reference herein.

BACKGROUND

Reflection seismology finds use in geophysics to estimate properties of subsurface formations. Reflection seismology can provide seismic data representing waves of elastic energy (as transmitted by P-waves and S-waves, in a frequency range of approximately 1 Hz to approximately 100 Hz). Seismic data may be processed and interpreted to understand better composition, fluid content, extent and geometry of subsurface rocks.

SUMMARY

In accordance with some embodiments, a seismic sensor assembly includes a sensor body; cable connectors operatively coupled to the sensor body; and a grounding clamp operatively coupled to the cable connectors. In accordance with some embodiments, a lightning strike kit for a seismic sensor assembly includes an electrically conductive component that includes at least one arm and a base portion for electrical coupling to a base and/or a spike of a seismic sensor assembly. Various other assemblies, components, kits, methods, systems, etc. are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

The following description includes embodiments of the best mode presently contemplated for practicing the described implementations. This description is not to be taken in a limiting sense, but rather is made merely for the purpose of describing the general principles of the implementations. The scope of the described implementations should be ascertained with reference to the issued claims.

As mentioned, reflection seismology finds use in geophysics to estimate properties of subsurface formations. Reflection seismology may provide seismic data representing waves of elastic energy (as transmitted by P-waves and S-waves, in a frequency range of approximately 1 Hz to approximately 100 Hz or optionally less than 1 Hz and/or optionally more than 100 Hz). Seismic data may be processed and interpreted to understand better composition, fluid content, extent and geometry of subsurface rocks.

Figure 1:
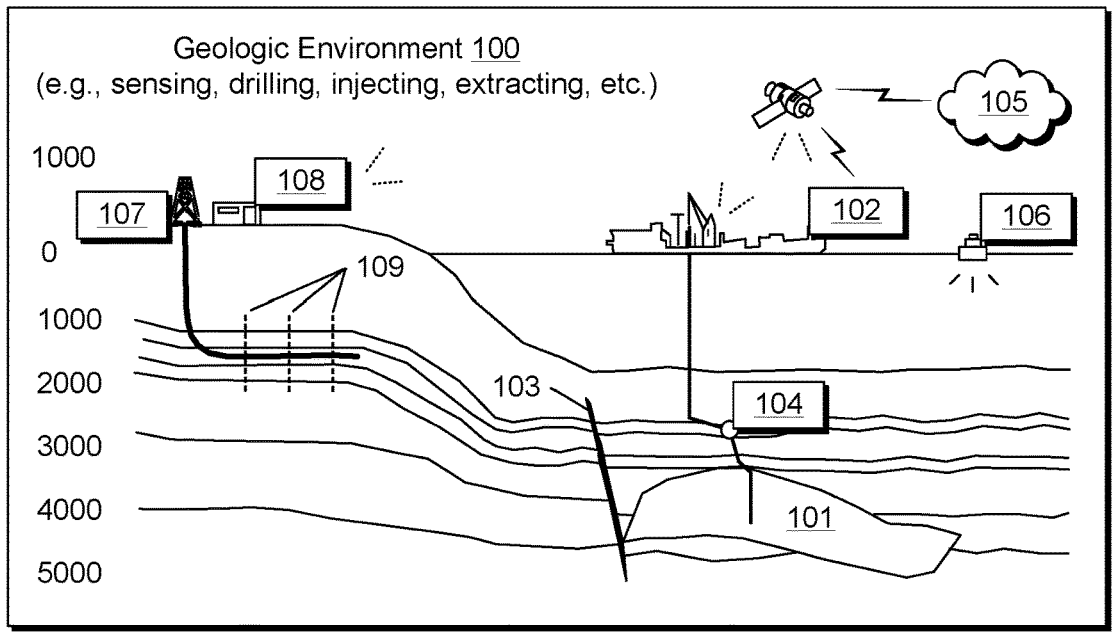
FIG. 1 illustrates a geologic environment and a technique.
Figure 1:
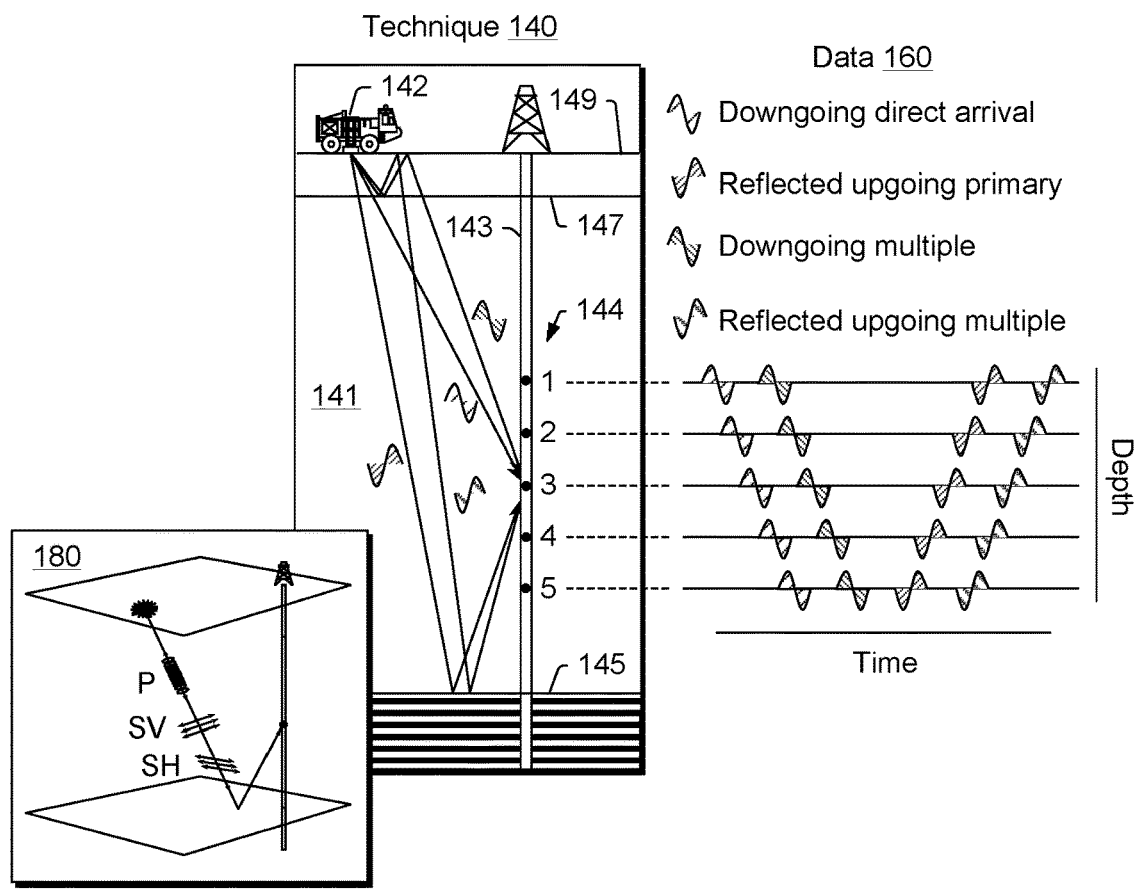

FIG. 1 shows a geologic environment 100 (an environment that includes a sedimentary basin, a reservoir 101, a fault 103, one or more fractures 109, etc.) and an acquisition technique 140 to acquire seismic data such as data 160. A system may process data acquired by the technique 140 to allow for direct or indirect management of sensing, drilling, injecting, extracting, etc., with respect to the geologic environment 100. In turn, further information about the geologic environment 100 may become available as feedback (optionally as input to the system). An operation may pertain to a reservoir that exists in the geologic environment 100 such as the reservoir 101.

A system may be implemented to process seismic data, optionally in combination with other data. Processing of data may include generating one or more seismic attributes, rendering information to a display or displays, etc. A process or workflow may include interpretation, which may be performed by an operator that examines renderings of information and that identifies structure or other features within such renderings. Interpretation may be or include analyses of data with a goal to generate one or more models and/or predictions (about properties and/or structures of a subsurface region).

A system may include features of a commercially available framework such as the PETREL® seismic to simulation software framework (Schlumberger Limited, Houston, Tex.). A system may include add-ons or plug-ins that operate according to specifications of a framework environment. A commercially available framework environment marketed as the OCEAN® framework environment (Schlumberger Limited, Houston, Tex.) allows for integration of add-ons (or plug-ins) into a PETREL® framework workflow. Seismic data may be processed using a framework such as the OMEGA® framework (Schlumberger Limited, Houston, Tex.). The OMEGA® framework provides features that can be implemented for processing of seismic data.

In FIG. 1, the geologic environment 100 includes an offshore portion and an on-shore portion. A geologic environment may be or include one or more of an offshore geologic environment, a seabed geologic environment, an ocean bed geologic environment, etc. The geologic environment 100 may be outfitted with any of a variety of sensors, detectors, actuators, etc. Equipment 102 may include communication circuitry to receive and to transmit information with respect to one or more networks 105. Such information may include information associated with downhole equipment 104, which may be equipment to acquire information, to assist with resource recovery, etc. Other equipment 106 may be located remote from a well site and include sensing, detecting, emitting or other circuitry. Such equipment may include storage and communication circuitry to store and to communicate data, instructions, etc. One or more satellites may be provided for purposes of communications, data acquisition, etc. FIG. 1 shows a satellite in communication with the network 105 that may be configured for communications, noting that the satellite may additionally or alternatively include circuitry for imagery (spatial, spectral, temporal, radiometric, etc.).

FIG. 1 also shows the geologic environment 100 as optionally including equipment 107 and 108 associated with a well that includes a substantially horizontal portion that may intersect with one or more of the one or more fractures 109. Consider a well in a shale formation that may include natural fractures, artificial fractures (hydraulic fractures) or a combination of natural and artificial fractures. The equipment 107 and/or 108 may include components, a system, systems, etc. for fracturing, seismic sensing, analysis of seismic data, assessment of one or more fractures, etc.

In FIG. 1, the technique 140 may be implemented with respect to a geologic environment 141. As shown, an energy source (a transmitter) 142 may emit energy where the energy travels as waves that interact with the geologic environment 141. The geologic environment 141 may include a bore 143 where one or more sensors (receivers) 144 may be positioned in the bore 143. In FIG. 1, energy emitted by the energy source 142 may interact with a layer (a structure, an interface, etc.) 145 in the geologic environment 141 such that a portion of the energy is reflected, which may then be sensed by one or more of the sensors 144. Such energy may be reflected as an upgoing primary wave (or "primary" or "singly" reflected wave). A portion of emitted energy may be reflected by more than one structure in the geologic environment and referred to as a multiple reflected wave (or "multiple"). The geologic environment 141 is shown as including a layer 147 that resides below a surface layer 149. Given such an environment and arrangement of the source 142 and the one or more sensors 144, energy may be sensed as being associated with particular types of waves.

As shown in FIG. 1, the acquired data 160 can include data associated with downgoing direct arrival waves, reflected upgoing primary waves, downgoing multiple reflected waves and reflected upgoing multiple reflected waves. The acquired data 160 is also shown along a time axis and a depth axis. As indicated, in a manner dependent at least in part on characteristics of media in the geologic environment 141, waves travel at velocities over distances such that relationships may exist between time and space. Thus, time information, as associated with sensed energy, may allow for understanding spatial relations of layers, interfaces, structures, etc. in a geologic environment.

FIG. 1 also shows various types of waves as including P, SV an SH waves. A P-wave is an elastic body wave or sound wave in which particles oscillate in the direction the wave propagates. P-waves incident on an interface (at other than normal incidence, etc.) may produce reflected and transmitted S-waves ("converted" waves). An S-wave or shear wave may be an elastic body wave in which particles oscillate perpendicular to the direction in which the wave propagates. S-waves may be generated by a seismic energy sources (other than an air gun). Recording of S-waves can involve use of one or more receivers operatively coupled to earth (capable of receiving shear forces with respect to time). Interpretation of S-waves may allow for determination of rock properties such as fracture density and orientation, Poisson's ratio and rock type by crossplotting P-wave and S-wave velocities, and/or by other techniques. Parameters that may characterize anisotropy of media (seismic anisotropy) can include the Thomsen parameters $\epsilon$, $\delta$ and $\gamma$.

Seismic data may be acquired for a region in the form of traces. In FIG. 1, the technique 140 may include the source 142 for emitting energy where portions of such energy (directly and/or reflected) may be received via the one or more sensors 144. Energy received may be discretized by an analog-to-digital converter that operates at a sampling rate. Acquisition equipment may convert energy signals sensed by a sensor to digital samples at a rate of one sample per approximately 4 ms. Given a speed of sound in a medium or media, a sample rate may be converted to an approximate distance. The speed of sound in rock may be of the order of around 5 km per second. Thus, a sample time spacing of approximately 4 ms would correspond to a sample "depth" spacing of about 10 meters (assuming a path length from source to boundary and boundary to sensor). A trace may be about 4 seconds in duration; thus, for a sampling rate of one sample at about 4 ms intervals, such a trace would include about 1000 samples where latter acquired samples correspond to deeper reflection boundaries. If the 4 second trace duration divided by two (to account for reflection), for a vertically aligned source and sensor, the deepest boundary depth may be estimated to be about 10 km (assuming a speed of sound of about 5 km per second).

Seismic data acquisition can include 3D and/or 4D land seismic data acquisition, such as during exploration for underground hydrocarbon-bearing reservoirs, or monitoring existing reservoirs. Electromagnetic signals may be used to transfer data to and/or from the sensor units, to transmit power, and/or to receive instructions to operate the sensor units.

Figure 2:
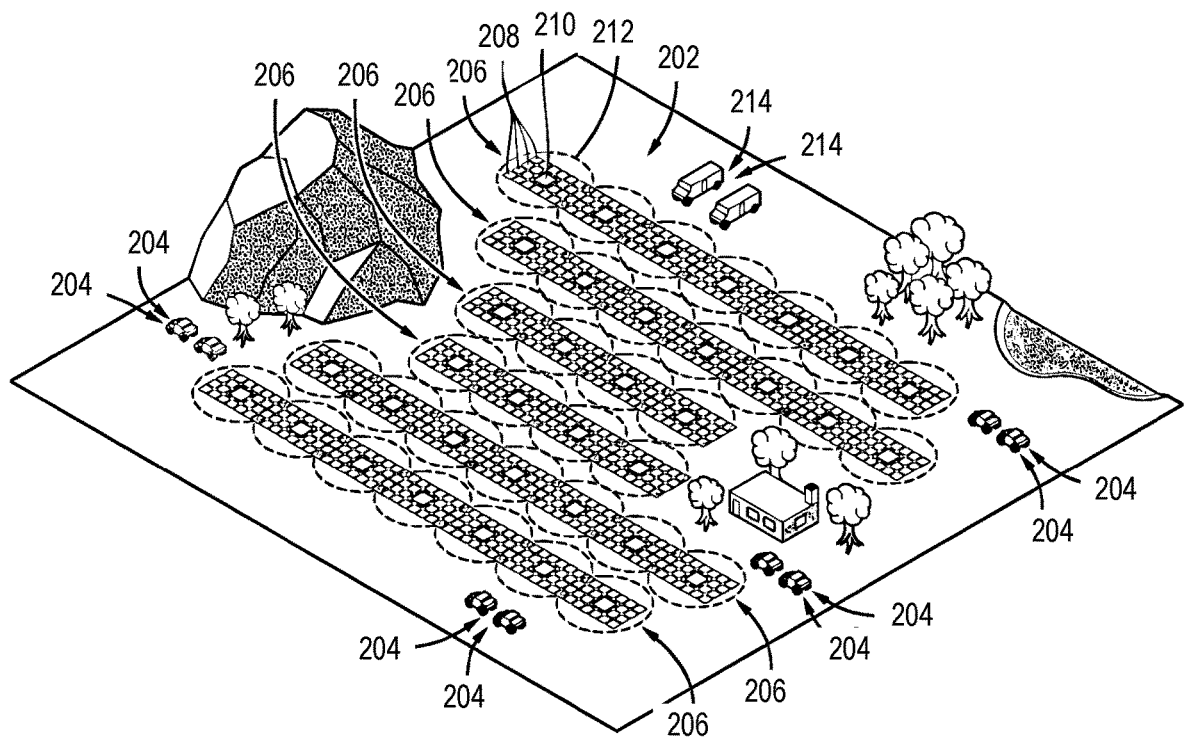
FIG. 2 illustrates a survey technique and associated equipment.
Figure 2:
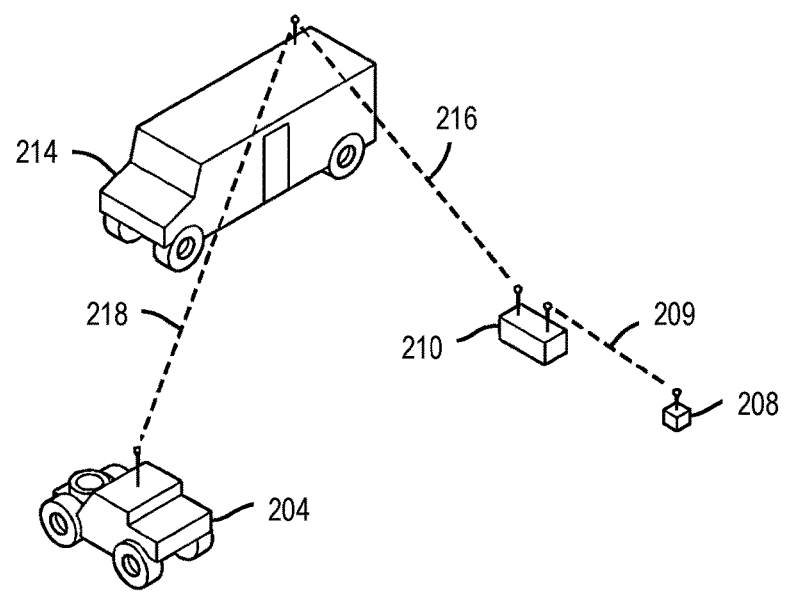

A simplified schematic view of a land seismic data acquisition system is illustrated in FIG. 2. As shown, an area 202 to be surveyed may or may not have physical impediments to direct wireless communication between a recording station 214 (which may be a recording truck) and a vibrator 204. A plurality of vibrators 204 may be employed, as well as a plurality of sensor unit grids 206, each of which may have a plurality of sensor units 208.

As illustrated in FIG. 2, approximately 24 to about 28 sensor units 208 may be placed in a vicinity (a region) around a base station 210. The number of sensor units 208 associated with each base station 210 may vary from survey to survey. Circles 212 indicate an approximate range of reception for each base station 210.

In the system of FIG. 2, the plurality of sensor units 208 may be employed in acquiring and/or monitoring land-seismic sensor data for the area 202 and transmitting the data to the one or more base stations 210. Communications between the vibrators 204, the base stations 210, the recording station 214, and the seismic sensors 208 may be wireless (at least in part via air for a land-based system; or optionally at least in part via water for a sea-based system).

FIG. 2 also shows equipment with respect to a wireless data network where the wireless data network can include the seismic sensors 208 transmitting at least a portion of seismic data they sense to the one or more base stations 210 via a first wireless link 209, which in turn can transmit at least some data they receive to the recording station 214 via a second wireless link 216. Commands may be sent from recording station 214 to the vibrators 204 via the wireless link 218, and, to the extent data is exchanged between the vibrators 204 and the recording station 214, the wireless links 218 may be considered part of the wireless data network.

Figure 3:
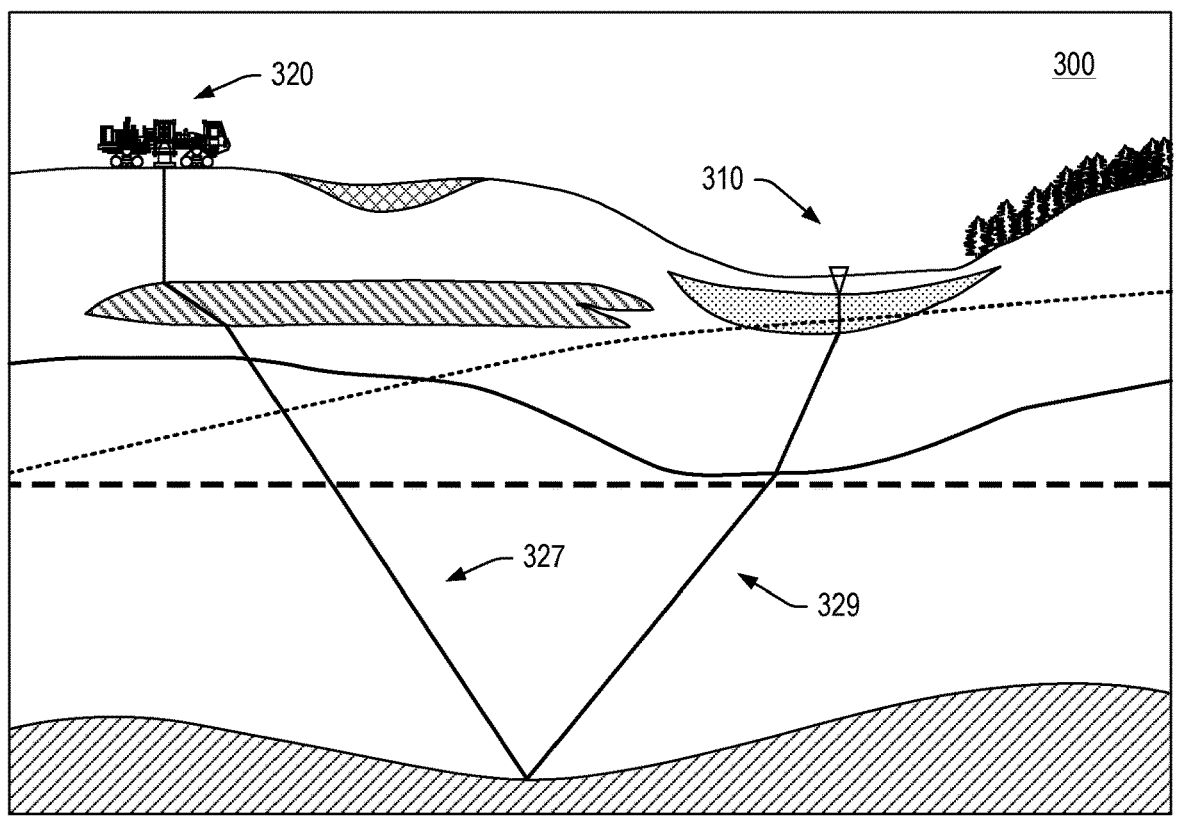
FIG. 3 illustrates equipment deployed in a field installation for performing a seismic survey.
Figure 3:
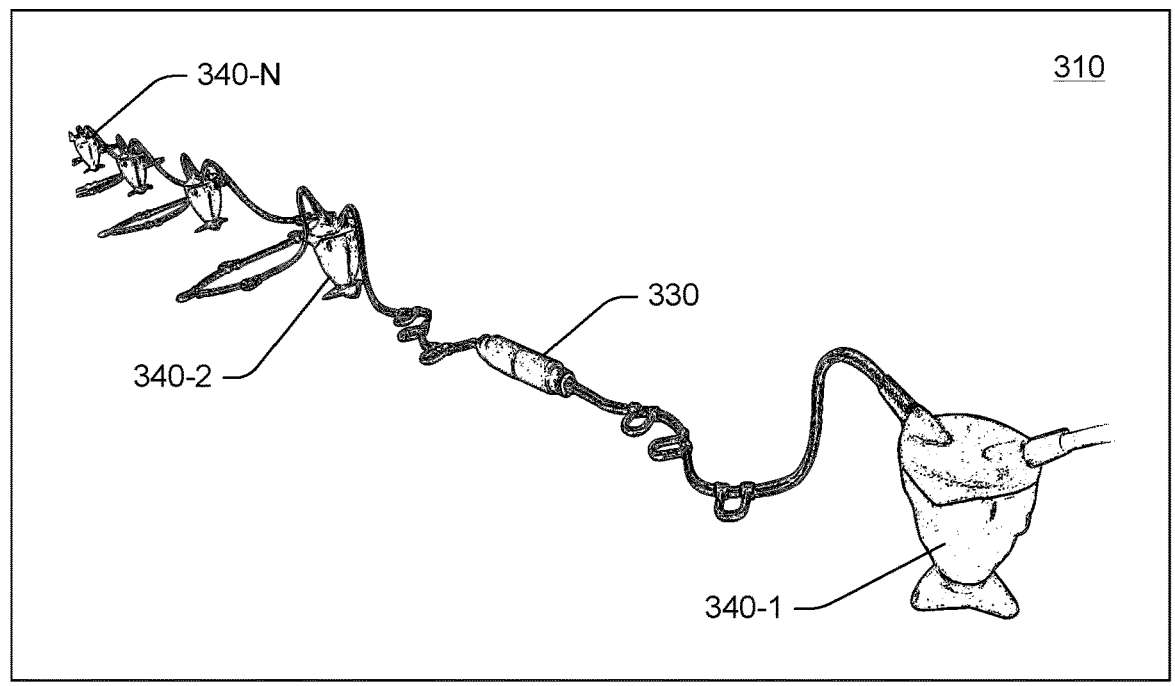

FIG. 3 shows a geologic environment 300, equipment 310 and 320, downgoing energy 327, upgoing energy 329 where the equipment 310 can include one or more cables 330 and a plurality of sensor units 340-1, 340-2 to 340-N as nodes in an array or grid.

The equipment 310 and 320 can be part of a field installation where the equipment 310 that includes an array of sensor units for performing a seismic survey where the equipment 320 includes one or more seismic energy emission vehicles that can emit seismic energy to be sensed by the array of sensors where data can be collected by a receiver vehicle that may be as operatively coupled to the array of sensors.

In FIG. 3, the geologic environment 300 may be a desert such that the cable 330 that includes the individual sensor units 340 for deployment by an individual as that individual walks along paths, which may be inline or crossline paths associated with a seismic survey. The individual may carry a rod where hooks may allow for looping the cable 330 and where the hooks may be slide off an end of the rod as the individual positions the individual sensor units 340. The individual sensor units 340 can include spikes that can be inserted into sand of a desert environment or tripod or other style base(s). The spikes may be of a length of the order of about 10 cm and be capable of conducting seismic energy to circuitry of the individual sensor units 340.

The equipment 310 represents a deployed line of sensor units 340-1, 340-2 to 340-N. As mentioned, such a line of sensors may be an inline or a crossline of a seismic survey.

A sensor unit may be a UNIQ™ sensor unit (Schlumberger Limited, Houston, Tex.) or another type of sensor unit. A sensor unit may include an accelerometer or accelerometers. A sensor may be a geophone. A sensor may include circuitry for 1 C acceleration measurement, 2 C acceleration measurement and/or 3 C acceleration measurement. A sensor unit can include memory to perform data buffering and optionally retransmission. A sensor unit may include short circuit isolation circuitry, open circuit protection circuitry and earth-leakage detection and/or isolation circuitry.

A sensor unit may include one or more of location circuitry (GPS, etc.), temperature measurement circuitry, humidity measurement circuitry, circuitry for automated re-routing of data and/or power (as to supply, connection, etc.) and one or more other types of circuitry.

A sensor unit may weigh about 0.40 kg (about 0.85 lb). A sensor unit may have a height of about 90 mm (about 3.5 in), a width of about 90 mm (about 3.5 in) and a depth of about 75 mm (about 3 in). A sensor unit may include one or more base options. While a spike is mentioned, other options may include a tripod, an Artic base, etc. A sensor unit may be suitable for use in shallow water (up to a depth of several meters). A sensor unit may include a temperature operational range of about—40 degrees C. to about 70 degrees C. (about—40 degrees F. to about 160 degrees F.). A sensor unit may be rated to operate at voltages from about 5 volts to about 100 volts or more; consider a sensor that operates in a range of about 25 volts to about 40 volts (plus voltage or minus voltage).

As mentioned, sensor units may be cabled to form a sensor string; consider a string of about 10 sensors (sensor units) where a lead-in length is about 7 meters, a mid-section length is about 14 meters and a weight is about 15 kg. Also, consider a string of about 5 sensor units where a lead-in length is about 15 meters and a mid-section length is about 30 meters and a weight is about 12 kg. Such string specifications may be utilized to understand dimensions of an array of sensors and how far a sensor unit is from one or more neighbors, to which it may be operatively coupled (via one or more conductors, conductive materials, etc.).

As to a power insertion unit (PIU), such a unit can be utilized for power and/or data routing. Such a unit may provide power for a few sensor units to tens of sensor units to hundreds of sensor units (consider a PIU that can power 500 or more sensors). A PIU may include lightening and/or emergency shutdown protection (ESD). A PIU can include communication and/or location circuitry. An installation can include a fiber-optic exchanger unit (FOX). Such a unit may be a router that can communicate with a PIU. Fiber optic cables may be included in an installation; consider FOX and PIU fiber optic couplings.

An installation may include over a thousand sensor units. An installation may include tens of thousands of sensor units. An installation may include over one hundred thousand sensor units.

Figure 4:
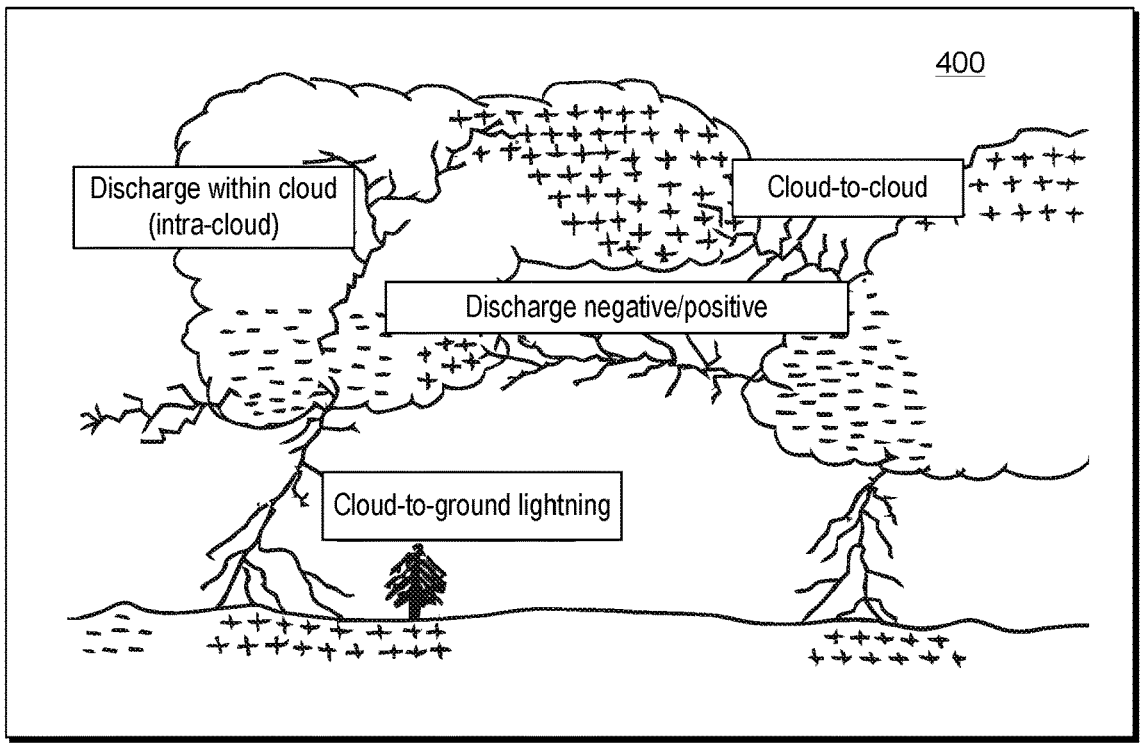
FIG. 4 illustrates lightning and a lightning strike as to equipment deployed in a field for performing a seismic survey.
Figure 4:
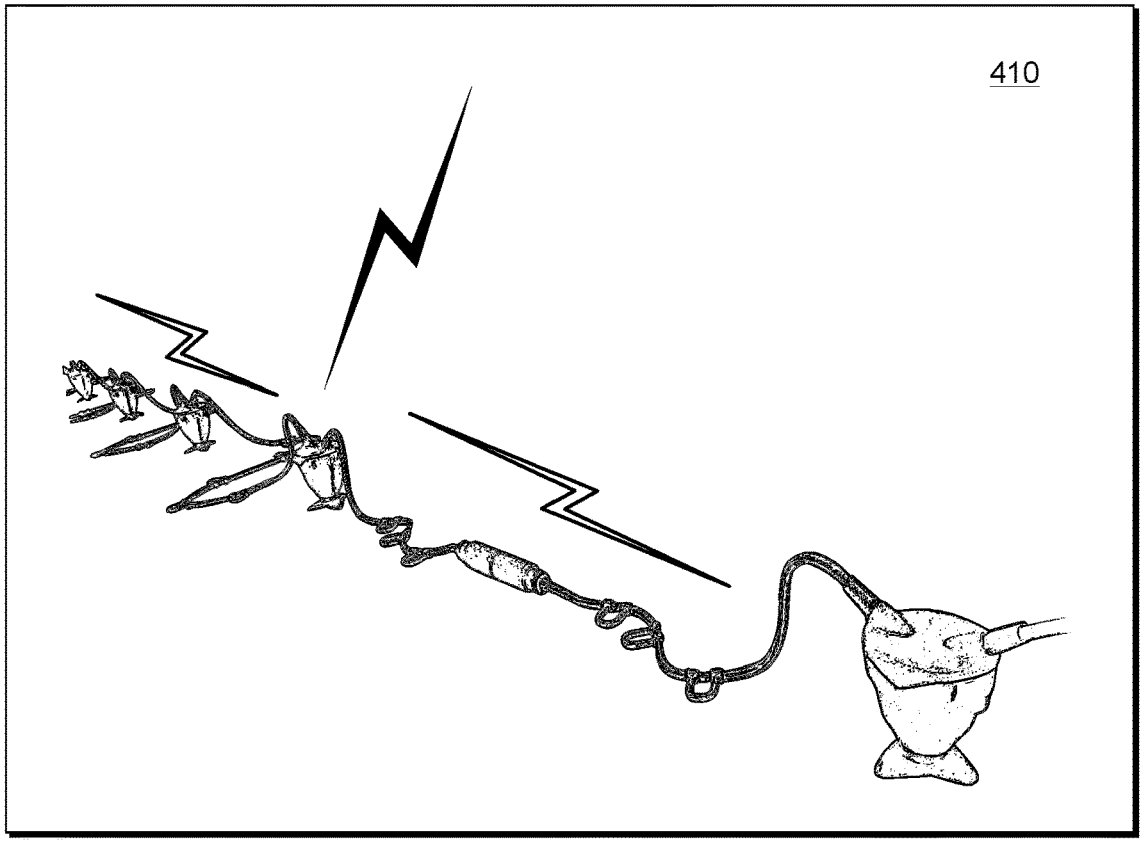

FIG. 4 shows lightning (lightening) generation and discharge 400 and deployed sensor units 410 being struck by lightning.

A lightning flash is composed of a series of strokes with an average of about four. The length and duration of each lightning stroke vary, but may average about 30 microseconds (consider an average peak power per stroke of about $10^{12}$ watts). Sound is generated along the length of the lightning channel as the atmosphere is heated by the electrical discharge to the order of 20,000 degrees C. This compresses the surrounding clear air producing a shock wave, which then decays to an acoustic wave as it propagates away from the lightning channel.

While some types of lightning are illustrated in FIG. 4, there are numerous names and descriptions of various types and forms of lightning. Some identify subcategories, and others may arise from optical illusions, appearances, or myths. Some popular terms include: ball lightning, heat lightning, bead lightning, sheet lightning, silent lightning, black lightning, ribbon lightning, colored lightning, tubular lightning, meandering lightning, cloud-to-air lightning, stratospheric lightning, red sprites, blue jets, and elves.

As to lightning discharge, with the initial breakdown of air in a region of strong electric fields, a streamer may begin to propagate downward toward the Earth. It may move in discrete steps of about 50 meters each and be called a stepped leader. As it grows, it can create an ionized path depositing charge along the channel, and as the stepped leader nears the Earth, a large potential difference can be generated between the end of the leader and the Earth. A streamer may be launched from the Earth and intercept the descending stepped leader just before it reaches the ground. Once a connecting path is achieved, a return stroke flies up the already ionized path at close to the speed of light. This return stroke releases tremendous energy, bright light and thunder. Occasionally, where a thunderstorm grows over a tall Earth grounded object, such as a radio antenna, an upward leader may propagate from the object toward the cloud. This "ground-to-cloud" flash generally transfers a net positive charge to Earth and is characterized by upward pointing branches.

A so-called "dry" thunderstorm is a thunderstorm that produces thunder and lightning, but its precipitation largely evaporates before reaching the ground. "Dry" lightning is a term that may be used to refer to lightning strikes occurring in such scenarios; noting that "dry" lightning is a technical misnomer since lightning itself is neither wet nor dry.

Dry thunderstorms can occur in deserts or places where atmospheric water vapor is low. Because dry air tends to absorb liquid water, causing it to change phase into vapor, most of it is absorbed before reaching the ground and form virga.

In FIG. 4, a lightning strike can cause energy to travel along a cable or cables where it may impact one or more other sensor units.

A land sensor unit can include one or more lightning mitigation components. The sensor unit 340-1 of FIG. 3 may include one or more lightning mitigation components, which may be one or more optional components that can be fit to the sensor unit 340-1 (by an individual, etc.).

A land sensor unit can optionally include grounding ability that is increased by way of a conductive bracket, which may be a substantially U-shaped metal part.

As mentioned and illustrated in FIG. 4, the cabled land sensor units 410 can spread energy from lightning strikes. Energy from a single strike can travel via a cable or cables and damage a relatively large number of sensor units. Such damage may be quantified as being in a radius, a block, etc. as to a strike location associated with a strike and sensor units within the effected region. One or more lightning mitigation components can help to minimize a damage dimension (a damage radius). By increasing the grounding of sensors, the number of sensor units that are damaged can be reduced.

Figure 5:
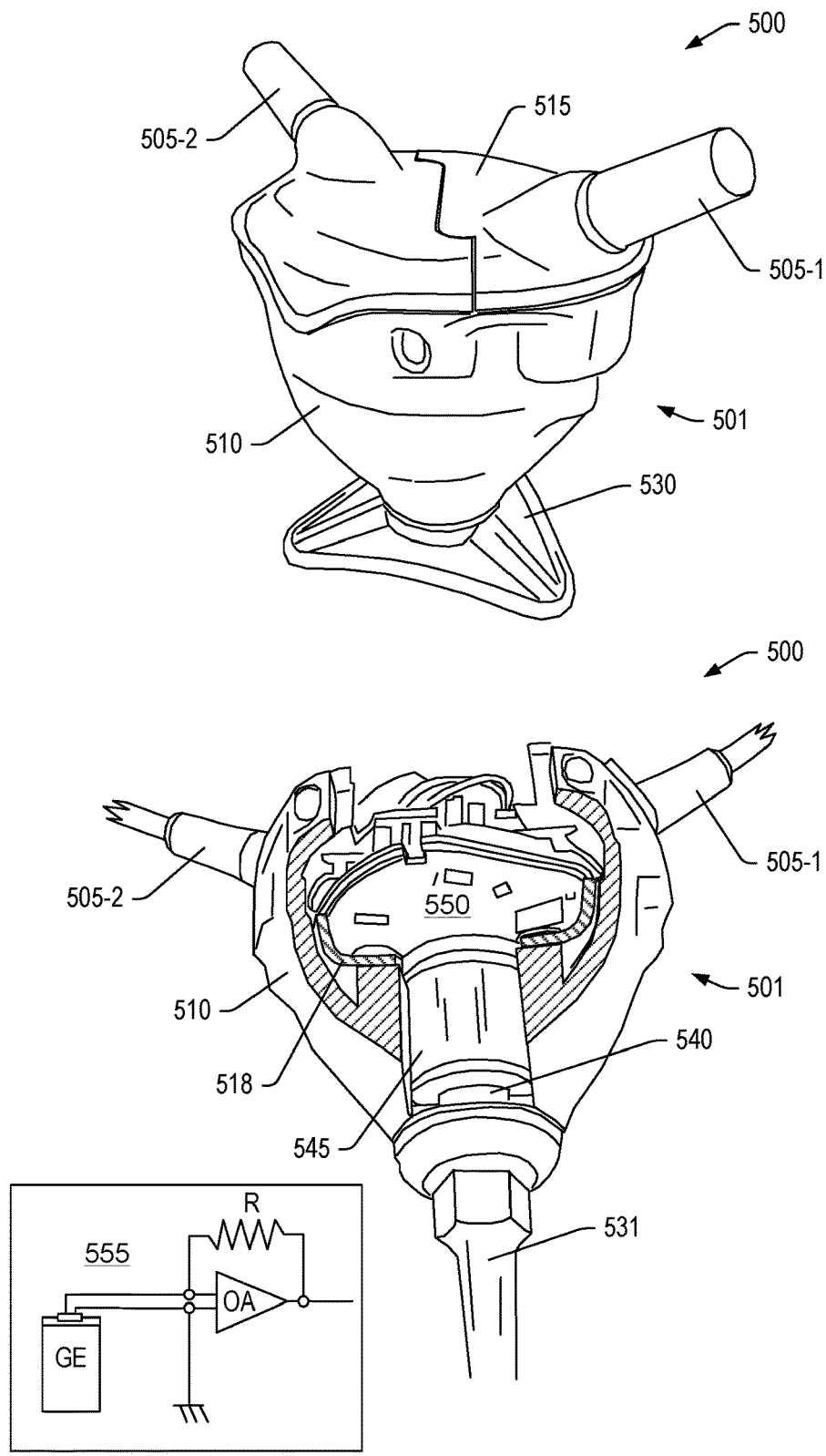
FIG. 5 illustrates a perspective view of an assembly, a cut-away view of an assembly and a circuit.

FIG. 5 shows an assembly 500, which may be referred to as a sensor unit (see also the sensor unit 340-1 of FIG. 3). As shown in FIG. 5, the assembly 500 includes a sensor body 501 with a housing 510, a ground shield 518, a sensor driver 540, a sensor assembly 545 and a circuitry board 550. The assembly 500 includes various components operatively coupled to the sensor body 501, including cable connectors 505-1 and 505-2, a cover 515 and a base 530 or a spike 531.

In FIG. 5, the circuitry board 550 can be a geophone accelerometer circuitry board (a GAC board). The sensor unit 500 can include a seismic system geophone accelerometer (a seismic system GAC) as the sensor assembly 545 that can sense motion (as operatively coupled to the sensor driver 540) where circuitry may be utilized to reduce signal distortion and/or increase bandwidth (consider an approximately 18 Hz geophone with additional electronic circuitry).

FIG. 5 shows a simplified circuitry diagram 555 where a geophone element (GE) can be connected across an input of an operational amplifier (OpAmp, labeled OA) circuit. A feedback resistor (R) can connect the OpAmp circuit output to the geophone element. If a GAC coil moves within its magnetic field, the voltage it generates is detected by the OpAmp circuit, which responds by sending a current back through the feedback resistor (R), which can act to damp coil movement. As force to hold the coil stationary can be proportional to the coil acceleration, the output voltage of the circuitry represents earth motion expressed as acceleration. As coil movement is reduced by more than an order of magnitude, the associated signal distortion may also be reduced by more than an order of magnitude. A negative feedback loop can widen the pass-band of a signal that it controls. An approximately 18 Hz tilt-indifferent geophone may be utilized as an accelerometer with an about—3 dB point below about 2 Hz. Choice of an about 18 Hz geophone may be suitable due to stiffness of springs and reduced coil displacement. Such an arrangement may allow for operation in various orientations while achieving some amount of optimization as to characteristics of a pass-band.

The assembly 500 may include electrical shock protection circuitry where the assembly can include conductive and/or non-conductive structural features and/or circuitry that can mitigate effects of lightning strikes (at or near the assembly 500, etc.). An assembly may include one or more gas discharge tubes (GDTs) and/or one or more thyristor surge protection devices (TSPDs) as part of a protection system. Such components may optionally be part of a lightning protection unit that can be operatively coupled to the assembly 500 to become part of the assembly 500.

The assembly 500 may be utilized in a field where a plurality of such assemblies is positioned according to a grid plan, etc., to form an array. Various assemblies may be operatively coupled via one or more cables. A cable or cables may be coupled to the cable connectors 505-1 and/or 505-2. In a field system, an individual assembly or sensor unit may be considered to be a node (a node of a grid, a node of an array, etc.).

The assembly 500 of FIG. 5 may be a UNIQ™ sensor unit (Schlumberger, Houston, Tex.). An assembly or a sensor unit may include circuitry that can output samples at intervals of 1 ms, 2 ms, 4 ms, etc. An assembly or sensor unit can include an analog to digital converter (ADC) such as a 24-bit sigma-delta ADC. An assembly or sensor unit may include synchronization circuitry such as GPS synchronization circuitry with an accuracy of about plus or minus 12.5 microseconds. An assembly or sensor unit may include circuitry for sensing of real-time and optionally continuous tilt, temperature, humidity, leakage, etc. An assembly or sensor unit may include calibration circuitry (self-calibration circuitry, etc.).

The assembly 500 of FIG. 5 may be about 90 mm in height, about 90 mm in width and about 80 mm in depth. A base of an assembly may be a spike, a tripod or other type of base. The assembly 500 of FIG. 5 may have a mass of about 0.4 kg. The assembly 500 of FIG. 5 may have a power consummation of the order of about 100 mW and an operating voltage in a range of about plus or minus 25 V to about plus or minus 40 V.

A field system that includes assemblies such as the assembly 500 of FIG. 5 may include one or more power insertion units (PIUs) such as the UNIQ™ PIU (Schlumberger Limited, Houston, Tex.). Such a unit may provide for power and/or data routing for a plurality of sensor units (up to hundreds of sensor units) and timing synchronization (via a clock and/or GPS). Such a unit may include data capacity of about 75 channels or more (for sampling intervals of about 1 ms, 2 ms, 4 ms, etc.).

A field system that includes assemblies such as the assembly 500 of FIG. 5 may include a source control unit such as an integrated source control (ISC) or integrated point-receiver land seismic system unit (consider the UNIQ™ ISC, Schlumberger Limited, Houston, Tex.). A source control unit can directly and/or indirectly provide for control of seismic energy sources. A source control unit may be operatively coupled to a plurality of seismic energy sources (tens or hundreds of seismic energy sources).

In FIG. 5, the assembly 500 includes the cable connectors 505-1 and 505-2 disposed at about 180 degrees from each other. As mentioned, a cable can include a plurality of such assemblies.

Cables may come into opposite points on a sensor unit, which may facilitate fitting the sensor with a substantially U-shaped grounding part. Where a spike is optionally employed, the grounding part can be electrically coupled to the spike (see the spike 531). Where a base such as the base 530 is optionally employed, the grounding part may be electrically coupled to the base. The base 530 can be made at least in part of an electrically conductive material. A base and/or a spike may be in contact with ground (earth). A base and/or a spike may support and help orient a sensor unit on the ground. Where lightning strikes a sensor unit and/or a cable operatively coupled to a sensor unit or units, the energy of the lightning may be dissipated at least in part via a base and/or a spike. One or more grounding components may be included as part of an assembly that are made at least in part of electrically conductive material that can route energy associated with a lightning strike to a base and/or a spike.

A kit can include one or more components to retrofit a sensor unit where the one or more components can help to reduce impact of lightning strikes. A kit can optionally include a plurality of components, optionally including circuitry. A kit may include a grounding component and may include protection circuitry, which may be provided as a protection circuitry board.

As mentioned, some relatively arid environments can be prone to lightning; whereas, other environments may be less prone. Thus, a kit can provide options for use where lightning may be likely. Such a kit may be usable without impacting a sensor unit's ability to sense seismic energy. A sensor unit can function with or without a grounding retrofit kit and/or a protection circuitry kit. A kit may be relatively easy to install and/or remove, making transition or transitions minimal with respect to amount of time involved. A kit may be suitable for use with a base and/or a spike. A kit or kits may be provided with features that may optionally allow for tool-less installation. A sensor unit may include one or more features that are already installed that allow for tool-less installation of a kit or kits. A tool-less installation kit or kits may allow for expedited installation and/or removal of one or more kit components. Tool-less installation may allow for on-site choices to be made depending on environmental and/or other conditions.

Figure 6:
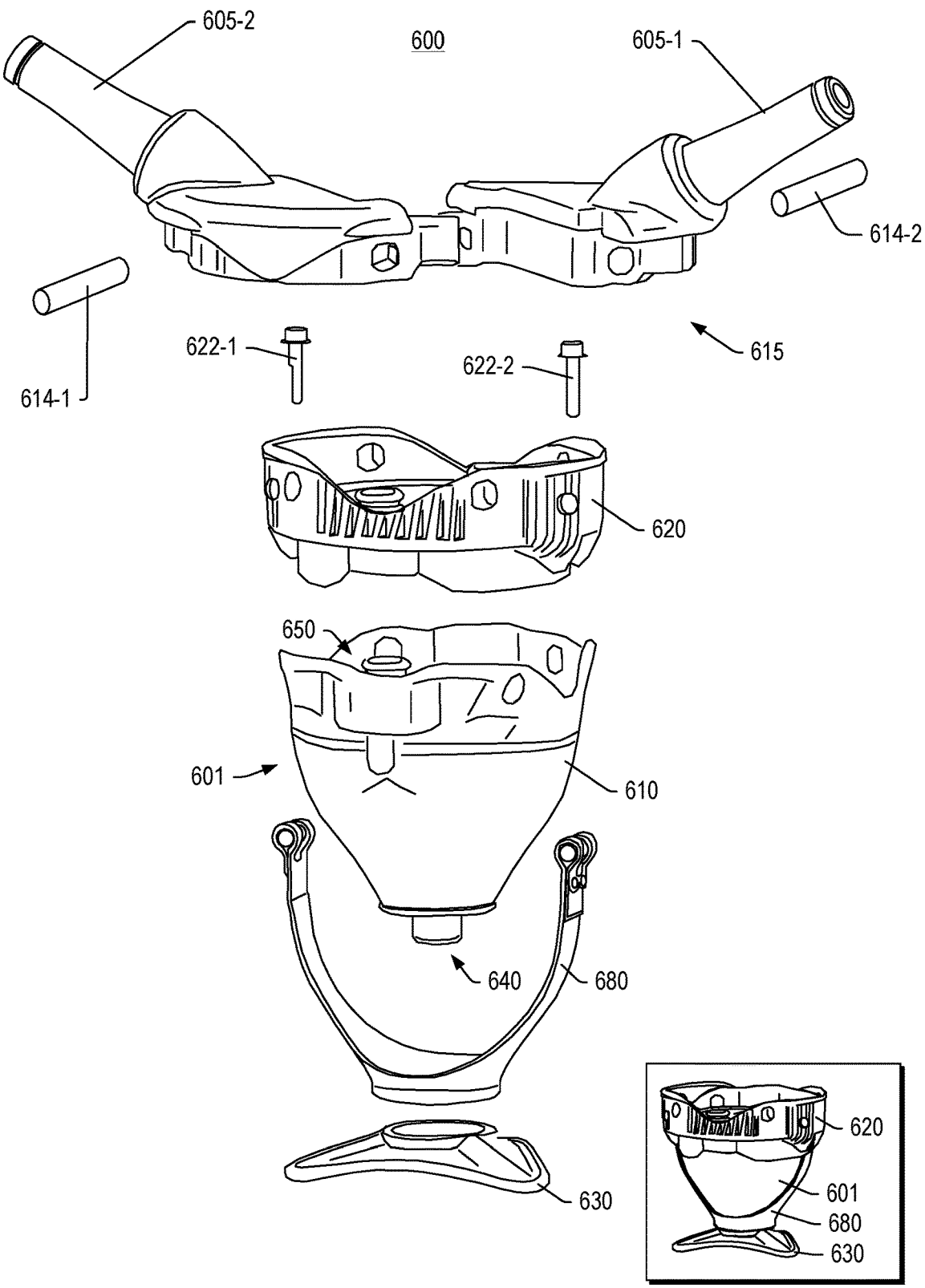
FIG. 6 illustrates an exploded view of an assembly, a perspective view of a housing and various components, and a perspective view of a portion of the assembly.

FIG. 6 shows an exploded view of an assembly 600 (a sensor unit) that includes a sensor body 601 with a housing 610, a lightning protection unit 620, a base 630, a sensor assembly 640, a circuitry board 650 and a grounding clamp 620 along with an inset perspective view of the housing 610 with associated components and an inset assembled view of the sensor body 601, the base 630, the lightning protection unit 620 and the grounding clamp 680.

As shown in FIG. 6, the assembly 600 includes cable connectors 605-1 and 605-2, pins 614-1 and 614-2, a multi-piece cover 615, the lightning protection unit 620, bolts 622-1 and 622-2, the base 630 (or a spike or other component to seat the assembly 600) and the grounding clamp 680. The pins 614-1 and 614-2 can be received by openings (bores) in the pieces of the multi-piece cover 615, the housing 610 and the lightning protection unit 620 and the bolts 622-1 and 622-2 can be utilized to couple the lightning protection unit 620 to the housing 610 of the sensor body 601. The bolts 622-1 and 622-2 may secure and electrically couple a ground shield (see the ground shield 518) to the housing 610 of the sensor body 601.

As shown in FIG. 6, the grounding clamp 680 is a substantially U-shaped electrically conductive component that can be operatively coupled to the lightning protection unit 620 at its open end (upper end of "U") and operatively coupled to the base plate 630 (and/or a spike, etc.).

In FIG. 6, the sensor body 601 may be sandwiched between the lightning protecting unit 620 and the grounding clamp 680. In such an arrangement, the sensor body 601 may be referred to as being nested by a kit that includes an upper component and a lower component that interconnect physically and electrically. As shown, the lightning protection unit 620 includes an upper rim contour that matches contours of the pieces of the multi-piece cover 615. Descending valleys of the lighting protection unit 620 correspond to descending portions of the multi-piece cover 615 and descending valleys of the sensor body 601 correspond to descending portions of the lightning protection unit 620 as oriented at about 90 degrees of rotation from those of the multi-piece cover 615.

A kit may include the lightning protection unit 620 and the grounding clamp 680. Lighting protection of a sensor can be enhanced as such a kit can help ground the sensor. In such a manner, a number of assemblies in an array may include such kits where, the larger the number of kitted assemblies deployed in the array, a fewer number of sensors may be damaged proximate to a lightning strike.

Grounding protection can be provided via a kit where the components of the kit provide a convenient and reliable physical path in metal for connecting at least a portion of a sensor to a grounding point of the sensor.

A kit may be a single component such as the grounding clamp 680 of the assembly 600 of FIG. 6. The sensor body 601 may be provided with the lightning protection unit 620 and without the grounding clamp 680 where the grounding clamp 680 may be added on for use in an environment where risks exist as to lightning strikes.

A kit may be a tool-less kit in that it can be at least installed without use of a tool. Pegs may be pushed by hand into openings of a component to secure a grounding clamp to a sensor unit. A kit may be installed using a single tool or multiple tools. A hammer and a rod, an awl or screwdriver may be used to lodge and dislodge one or more pins that can secure or unsecure the grounding clamp 680.

Figure 7:
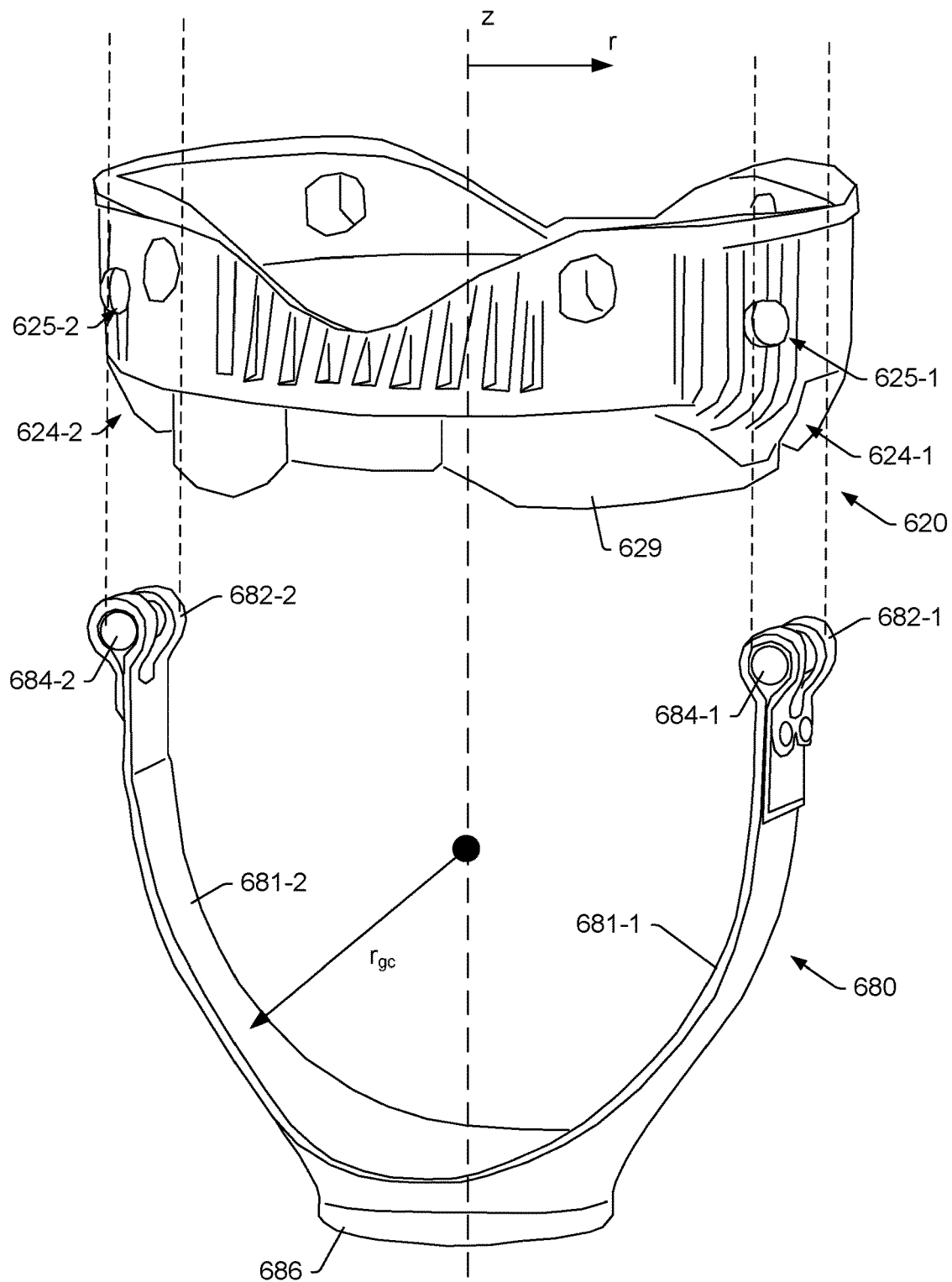
FIG. 7 illustrates components of the assembly of FIG. 6.

FIG. 7 shows the lightning protection unit 620 as including recesses 624-1 and 624-2 (slots, etc.) and openings 625-1 and 625-2 and the grounding clamp 680 as including arms 681-1 and 681-2 with ends 682-1 and 682-2 (upper ends) that can receive pegs 684-1 and 684-2 (pins) where the grounding clamp 680 includes a lower, base portion 686. In FIG. 7, the ends 682-1 and 682-2 of the arms 681-1 and 681-2 may be inserted into the recesses 624-1 and 624-2 of the lightning protection unit 620 to operatively couple the grounding clamp 680 to the lightning protection unit 620. The pegs 684-1 and 684-2 may be metallic and conductive and the grounding clamp 680 can be metallic and conductive (noting that a carbon-based conductive material may be utilized, a conductive composite material may be utilized, etc.). The pegs 684-1 and 684-2 may differ in shape, size, etc., from those illustrated. The pegs 684-1 and 684-2 may be longer, may include threads, may include a head, etc. The pegs 684-1 and 684-2 may be inserted into the openings 625-1 and 625-2 of the lighting protection unit 620 to be received by the ends of the arms 682-1 and 682-2 to secure and electrically connect the lighting protection unit 620 and the grounding clamp 680.

Energy associated with a lightning strike can travel to the assembly 600 via a cable or cables and then to the grounding clamp 680 and to the base 630 (and/or spike) and into the earth. A spike can offer an amount of earth/spike contact area that acts to distribute the energy radially in about 360 degrees into the earth. The sensor may be considered to be a point source in a hemispherical medium where the energy can dissipate in a hemispherical manner that acts to reduce risk of energy traveling from one sensor to another sensor (via a cable or cables). A dimension of a strike impact area may be reduced.

The assembly 600 of FIG. 6 can be a seismic sensor assembly that includes the sensor assembly 640 disposed at least in part in the housing 610 where the cable connectors 605-1 and 605-2 can be electrically coupled to one or more cables and where the grounding clamp 680 can be electrically coupled to the cable connectors 605-1 and 605-2 such that one or more electrically conductive paths to ground via the base 630 (or spike, etc.) exist. Such one or more electrically conductive paths to ground may optionally be controlled via circuitry, which may employ arrester technology. The lightning protection unit 620 can include arrester technology. The lighting protection unit 620 can include a shell portion 629 that may carry arrester circuitry that is or that can be electrically coupled to the grounding clamp 680, which is electrically coupled to the base 630 (or spike, etc.). Arrester circuitry may be switchable responsive to overvoltage or other physical effect associated with a lightning strike conducted to the assembly 600 via one or more cables.

Arrester technology may be classified as crowbar or clamp. Crowbar can include air gap, carbon block, GDT, silicon controlled rectifier (SCR), etc.; while clamp can include Zener (avalanche) diode, metal oxide varistor (MOV), etc. A crowbar circuit can be an electrical circuit that can protect to varying extent (based on design, etc.) against an overvoltage condition to help reduce risk of damage to circuits attached to a transient pathway. A crowbar circuit can provide a short circuit or low resistance path across a voltage path (akin to dropping a crowbar across the output terminals of a power supply). An overvoltage protection unit or assembly may optionally implement one or more types of arresting technology. Where protection circuitry is included in an assembly, as the voltage rises due to the transient, protection circuitry can crowbar to on-state to at least partially arrest the transient (via a clamping mechanism), which can include electrically coupling one or more pathways to the grounding clamp 680.

In the assembly 600, various components may be nesting components. The lightning protection unit 620 can nest within an opening of the housing 610 and the housing 610 can nest at least in part between the lightning protection unit 620 and the grounding clamp 680.

In FIG. 7, a coordinate system is illustrated as including a z-axis and an r-axis. A coordinate system may be a cylindrical coordinate system that includes an angle such as an azimuthal angle (r, z, Θ). Various features of a sensor (a sensor assembly, etc.) and/or one or more grounding components (a lightning protection unit, a grounding clamp, etc.) may be described with respect to a coordinate system such as a cylindrical coordinate system. In FIG. 7, the arms 681-1 and 681-2 may rise in the z-direction while spreading in opposite r-directions (optionally defined by a radius $r_{gc}$). While two arms are shown, a grounding clamp may include one arm or a plurality of arms. A one to one correspondence between cable connectors and arms may be provided by a grounding clamp. A grounding clamp may be disposed at a distance from a housing such that lightning strike energy is routed via the grounding clamp at a distance from the housing, which may help to protect components disposed at least in part within the housing.

Where a plurality of sensor assemblies include grounding components such as a grounding clamp, the ability to ground lightning strike energy can increase for an array, which may lead to mitigation of lightning strike damage to the array. A dimension of impact may be reduced where sensor assemblies can individually ground lightning strike energy more effectively.

A seismic sensor assembly can include a sensor body; cable connectors operatively coupled to the sensor body; and a grounding clamp operatively coupled to the cable connectors. In such an assembly, the grounding clamp can include a substantially U-shaped component.

A seismic sensor assembly can include a lightning protection unit operatively coupled to cable connectors and operatively coupled to a grounding clamp. A seismic sensor assembly can include a sensor body that includes a substantially funnel shape.

A seismic sensor assembly can include a grounding clamp that does not directly contact a sensor body.

A seismic sensor assembly can include a spike or spikes. In such an assembly, a grounding clamp can be electrically coupled to the spike or spikes.

A seismic sensor assembly can include a lightening protection unit where a grounding clamp includes arms where ends of the arms are received by receptacles of a lightning protection unit. In such an assembly, the arms of the grounding clamp can include bores that receive pegs that operatively couple the grounding clamp to the lightning protection unit.

A seismic sensor assembly can include a base. In such an assembly, a grounding clamp can be electrically coupled to the base.

A grounding clamp can include at least one arm. A grounding clamp can include a unitary piece of metal shaped with at least one arm (one arm, two arms, three arms, four arms, etc.).

A grounding clamp can include a base portion and at least one arm that extends upwardly from the base portion. The grounding clamp can include at least two arms that extend upwardly from the base portion.

A seismic sensor assembly can include a lightning protection unit that is electrically coupled to cable connectors. Such a lightning protection unit can include at least one receptacle that receives at least one arm of a grounding clamp. A seismic sensor assembly can include two cable connectors, the lightning protection unit can include two receptacles and the grounding clamp can include two arms. A seismic sensor assembly can include a grounding clamp with a number of arms that corresponds to a number of cable connectors of the seismic sensor assembly.

A sensor body can be disposed at least in part between a portion of a grounding clamp and a portion of a lightning protection unit. A grounding clamp can include a base portion and at least one arm that is operatively coupled to the lightning protection unit where the sensor body can be defined at least in part by a longitudinal axis from a base to a top where the lighting protection unit can be seated at the top of the sensor unit and where the base portion of the grounding clamp can be seated at or proximate to the bottom of the sensor unit. Arrester circuitry of a lightning protection unit can be switchable such that an overvoltage condition electrically couples a conductor of a cable via a cable connector to a grounding clamp. Such an arrangement may act to protect sensor circuitry from the overvoltage condition.

A seismic sensor assembly can include a sensor body that has a substantially funnel shape. A housing of a sensor body may be defined as having a base and a top where a cross-sectional area of the base is less than a cross-sectional area of the top. The top and the base may be substantially centered along a longitudinal axis. A grounding clamp can include arms that extend upwardly from a base portion of the grounding clamp where the arms do not physically, directly contact the housing of the sensor body. Such a grounding clamp may be of a wishbone shape, particularly where a spike is electrically connected to the grounding clamp. The grounding clamp can include curved arms at substantially follow a funnel shape of a housing of a sensor body without directly contacting the funnel shaped housing of the sensor body (the arms being disposed radially outward from an outer surface of the funnel shaped housing).

A seismic sensor assembly can include a lightning protection unit where the grounding clamp includes arms where each arm includes a bore that receives a peg that operatively couples the grounding clamp to the lightning protection unit. A seismic sensor assembly can include a cover where cable connectors are operatively coupled to the cover. Such a cover may cover a top of a lightning protection unit and thereby cover a top of a sensor body.

A seismic sensor assembly can include a lightning protection unit operatively coupled to cable connectors and operatively coupled to a grounding clamp. In such an assembly, the lightning protection unit can include arrester circuitry that operates to arrest energy received via one or more of the cable connectors (lightning strike energy).

A lightning strike kit for a seismic sensor assembly can include an electrically conductive component that includes at least one arm and a base portion for electrical coupling to a base and/or a spike of a seismic sensor assembly. In such an kit, the component may be a grounding clamp. A lightning strike kit can also include a lightning protection unit where at least one arm of an electrically conductive component is receivable by a receptacle of the lightning protection unit where a seismic sensor body of a seismic sensor assembly is disposed at least in part between the base portion of the electrically conductive component and at least a portion of the lightning protection unit.

A system may include one or more modules, which may be provided to analyze data, control a process, perform a task, perform a workstep, perform a workflow, etc.

Figure 8:
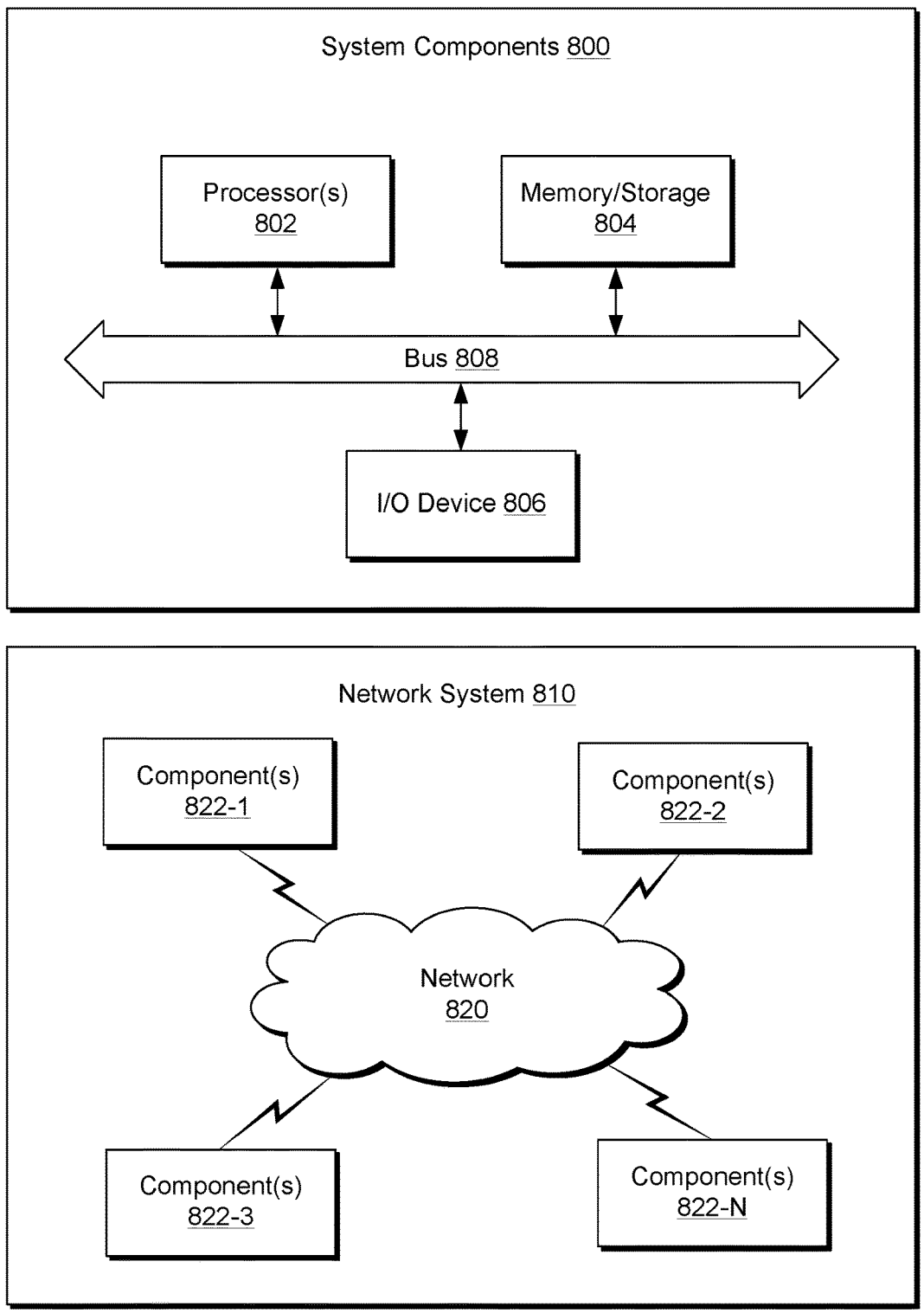
FIG. 8 illustrates components of a system and a networked system.

FIG. 8 shows components of a computing system 800 and a networked system 810. The system 800 includes one or more processors 802, memory and/or storage components 804, one or more input and/or output devices 806 and a bus 808. Instructions may be stored in one or more computer-readable media (see memory/storage components 804). Such instructions may be read by one or more processors (see the processor(s) 802) via a communication bus (see the bus 808), which may be wired or wireless. The one or more processors may execute such instructions to implement (wholly or in part) one or more attributes (as part of a method). A user may view output from and interact with a process via an I/O device (see the device 806). A computer-readable medium may be a storage component such as a physical memory storage device such as a chip, a chip on a package, a memory card, etc. (a computer-readable storage medium).

Components may be distributed, such as in the network system 810. The network system 810 includes components 822-1, 822-2, 822-3, ... 822-N. The components 822-1 may include the processor(s) 802 while the component(s) 822-3 may include memory accessible by the processor(s) 802. Further, the component(s) 822-2 may include an I/O device for display and optionally interaction with a method. The network may be or include the Internet, an intranet, a cellular network, a satellite network, etc.

A device may be a mobile device that includes one or more network interfaces for communication of information. A mobile device may include a wireless network interface (operable via IEEE 802.11, ETSI GSM, BLUETOOTH®, satellite, etc.). A mobile device may include components such as a main processor, memory, a display, display graphics circuitry (optionally including touch and gesture circuitry), a SIM slot, audio/video circuitry, motion processing circuitry (accelerometer, gyroscope, etc.), wireless LAN circuitry, smart card circuitry, transmitter circuitry, GPS circuitry, and a battery. A mobile device may be configured as a cell phone, a tablet, etc. A method may be implemented (wholly or in part) using a mobile device. A system may include one or more mobile devices.

A system may be a distributed environment such as a so-called "cloud" environment where various devices, components, etc. interact for purposes of data storage, communications, computing, etc. A device or a system may include one or more components for communication of information via one or more of the Internet (where communication occurs via one or more Internet protocols), a cellular network, a satellite network, etc. A method may be implemented in a distributed environment (wholly or in part as a cloud-based service).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A seismic sensor assembly comprising:
   a cover having cable connectors;
   a lightning protection unit comprising a lightning protection circuit having arrester circuitry disposed in a first housing;
   a sensor body comprising a seismic sensor disposed in a second housing;
   a grounding clamp comprising first and second arms coupled to a base portion, wherein the first and second arms extend outside of the second housing of the sensor body at a distance away from an exterior surface of the second housing, wherein the first and second arms are removably coupled to the first housing of the lightning protection unit at respective first and second connections; and
   an electrically conductive grounding path through the cable connectors, the lightning protection unit, and the grounding clamp, wherein the electrically conductive grounding path is configured to route any lightning strike energy at the distance from the exterior surface of the second housing via the first and second arms;
   wherein the first housing of the lightning protection unit is disposed removably axially between the cover and the second housing of the sensor body relative to a central axis through the seismic sensor assembly; and
   wherein the second housing of the sensor body is disposed removably axially between the first housing of the lightning protection unit and the base portion of the grounding clamp relative to the central axis.

2. The seismic sensor assembly of claim 1, wherein the grounding clamp comprises a substantially U-shaped component defined by the first and second arms and the base portion.

3. The seismic sensor assembly of claim 1, wherein the first connection comprises a first peg disposed in a first opening in the lightning protection unit, and the second connection comprises a second peg disposed in a second opening in the lightning protection unit.

4. The seismic sensor assembly of claim 3, wherein the first arm is disposed in a first recess or slot in the lightning protection unit, and the second arm is disposed in a second recess or slot in the lightning protection unit.

5. The seismic sensor assembly of claim 4, wherein the first arm comprises a first bore that receives the first peg and the second arm comprises a second bore that receives the second peg.

6. The seismic sensor assembly of claim 1, wherein the lightning protection unit is electrically coupled to the cable connectors, wherein the lightning protection circuit comprises conductive and non-conductive components configured to mitigate effects of lightning strikes, and wherein the lightning protection circuit is configured to selectively couple the electrically conductive grounding path to ground.

7. The seismic sensor assembly of claim 1, wherein the first housing of the lightning protection unit is removably coupled to the second housing of the sensor body via one or more fasteners.

8. The seismic sensor assembly of claim 7, wherein the lightning protection unit is removably coupled to the first and second arms of the grounding clamp via the respective first and second connections completely separate from the second housing of the sensor body.

9. The seismic sensor assembly of claim 8, wherein the first and second arms are disposed at the distance from the exterior surface of the second housing of the sensor body from the first and second connections to the base portion.

10. The seismic sensor assembly of claim 1, wherein the second housing of the sensor body comprises a substantially funnel shape.

11. The seismic sensor assembly of claim 1, wherein the first and second arms of the grounding clamp do not physically, directly contact the second housing of the sensor body.

12. The seismic sensor assembly of claim 1, comprising a spike coupled to the base portion, wherein the base portion of the grounding clamp is electrically and physically coupled to the spike.

13. The seismic sensor assembly of claim 1, wherein the arrester circuitry comprises at least one of a gas discharge tube (GDT), a thyristor surge protection device (TSPD), a crowbar circuit, a clamp circuit comprising a metal oxide varistor (MOV) or a Zener diode.

14. The seismic sensor assembly of claim 13, wherein the arrester circuitry operates to arrest energy received via one or more of the cable connectors, wherein the arrester circuitry is configured to switch to an on-state in response to lightning strikes.

15. A lightning strike kit for a seismic sensor assembly, the lightning strike kit comprising:
a grounding clamp comprising an electrically conductive component that comprises first and second arms coupled to a base portion for electrical coupling to a base and/or a spike; and
a lightning protection unit comprising a lightning protection circuit board comprising arrester circuitry disposed in a first housing configured to be removably coupled to a second housing of a sensor body having a seismic sensor, wherein the arrester circuitry is configured to reduce an impact of lightning strikes on the seismic sensor, wherein the lightning strike kit is configured to mount outside and separate from the second housing of the sensor body with the first housing of the lightning protection unit and the base portion of the grounding clamp disposed on axially opposite sides of the second housing of the sensor body, wherein the first and second arms of the grounding clamp physically and electrically couple with the lightning protection unit via respective first and second connections on the lightning protection unit, wherein the first and second arms are configured to be disposed at a distance from an exterior surface of the second housing of the sensor body from the first and second connections to the base portion such that the first and second arms of the grounding clamp do not physically, directly contact the second housing of the sensor body.

16. The lightning strike kit of claim 15, wherein the lightning protection circuit board is configured to be switchable to an on-state to at least partially arrest voltage rises due to the lightning strikes.

17. A system, comprising:
a grounding clamp comprising first and second arms coupled to a base portion, wherein the first and second arms curve away from the base portion and diverge away from one another; and
a lightning protection unit that comprises a lightning protection circuit disposed in a first housing configured to be removably coupled to a second housing of a sensor body having a seismic sensor, wherein the lightning protection circuit is configured to protect the seismic sensor from a lightning strike, wherein the grounding clamp is configured to mount outside and separate from the second housing of the sensor body with the first housing of the lightning protection unit and the base portion of the grounding clamp disposed on axially opposite sides of the second housing of the sensor body, wherein the first and second arms of the grounding clamp physically and electrically couple with the lightning protection unit via respective first and second connections on the lightning protection unit, wherein the first and second arms are configured to be disposed at a distance from an exterior surface of the second housing of the sensor body from the first and second connections to the base portion such that the first and second arms of the grounding clamp do not physically, directly contact the second housing of the sensor body;
wherein the lightning protection circuit comprises at least one of a plurality of lightning protection components, comprising: a gas discharge tube (GDT), a thyristor surge protection device (TSPD), a crowbar circuit, a clamp circuit comprising a metal oxide varistor (MOV) or a Zener diode, switching circuitry configured to switch to an on-state in response to the lightning strike, or a combination thereof.

18. The system of claim 17, comprising the seismic sensor.

19. The system of claim 17, comprising at least three of the plurality of lightning protection components.

* * * * *

UNITED STATES PATENT AND TRADEMARK OFFICE
CERTIFICATE OF CORRECTION

PATENT NO. : 11,385,366 B2
APPLICATION NO. : 16/094485
DATED : July 12, 2022
INVENTOR(S) : Sara Amar and Lars Muller It is certified that error appears in the above-identified patent and that said Letters Patent is hereby corrected as shown below:

On the Title Page

Item (73) Assignee:
Replace "WesternGeco L.L.C., Houston, TX (US)"
With --Schlumberger Technology Corporation, Sugar Land, TX (US)--

Signed and Sealed this
Thirtieth Day of August, 2022

Katherine Kelly Vidal
*Director of the United States Patent and Trademark Office*